(12) United States Patent
Hunt

(10) Patent No.: US 8,077,998 B2
(45) Date of Patent: Dec. 13, 2011

(54) REDUCED COMPLEXITY AND BLUR TECHNIQUE FOR AN ELECTRONIC LIGHTING SYSTEM

(75) Inventor: Mark A. Hunt, Derby (GB)

(73) Assignee: Production Resource Group, LLC, New Windsor, NY (US)

( * ) Notice: Subject to any disclaimer, the term of this patent is extended or adjusted under 35 U.S.C. 154(b) by 1597 days.

(21) Appl. No.: 11/029,663

(22) Filed: Jan. 4, 2005

(65) Prior Publication Data
US 2005/0190985 A1    Sep. 1, 2005

Related U.S. Application Data

(60) Provisional application No. 60/534,607, filed on Jan. 5, 2004.

(51) Int. Cl.
*G06K 9/40* (2006.01)
(52) U.S. Cl. ........................ 382/264; 382/254
(58) Field of Classification Search .......... 382/260, 382/264, 254; 345/435, 581; 348/586, 597
See application file for complete search history.

(56) References Cited

U.S. PATENT DOCUMENTS

| | | | |
|---|---|---|---|
| 5,414,328 A | 5/1995 | Hunt et al. | |
| 5,502,627 A | 3/1996 | Hunt et al. | |
| 5,588,021 A | 12/1996 | Hunt et al. | |
| 5,769,531 A | 6/1998 | Hunt et al. | |
| 5,788,365 A | 8/1998 | Hunt et al. | |
| 5,812,596 A | 9/1998 | Hunt et al. | |
| 5,828,485 A | 10/1998 | Hewlett | |
| 5,862,400 A * | 1/1999 | Reed et al. | 712/34 |
| 5,921,659 A | 7/1999 | Hunt et al. | |
| 5,969,485 A | 10/1999 | Hunt | |
| 5,983,280 A | 11/1999 | Hunt | |
| 6,029,122 A | 2/2000 | Hunt | |
| 6,057,958 A | 5/2000 | Hunt | |
| 6,175,771 B1 | 1/2001 | Hunt et al. | |
| 6,256,136 B1 | 7/2001 | Hunt | |
| 6,466,357 B2 | 10/2002 | Hunt | |
| 6,538,797 B1 | 3/2003 | Hunt | |
| 6,549,326 B2 | 4/2003 | Hunt et al. | |
| 6,597,132 B2 | 7/2003 | Hunt et al. | |
| 6,801,353 B2 | 10/2004 | Hunt et al. | |
| 6,891,656 B2 | 5/2005 | Hunt | |
| 6,894,443 B2 | 5/2005 | Hunt et al. | |
| 6,934,071 B2 | 8/2005 | Hunt | |
| 7,057,797 B2 | 6/2006 | Hunt | |
| 7,161,562 B1 | 1/2007 | Hunt | |
| 7,230,752 B2 | 6/2007 | Hewlett et al. | |
| 7,270,444 B2 | 9/2007 | Hunt et al. | |
| 2001/0050800 A1 | 12/2001 | Hunt | |
| 2002/0070689 A1 | 6/2002 | Hunt et al. | |
| 2002/0109905 A1 | 8/2002 | Hunt et al. | |
| 2002/0141037 A1 | 10/2002 | Hunt et al. | |
| 2003/0107795 A1 | 6/2003 | Hunt | |

(Continued)

*Primary Examiner* — Yon Couso
(74) *Attorney, Agent, or Firm* — Law Office of Scott C. Harris, Inc.

(57) ABSTRACT

Digital blurring of an image is carried out by blurring using a linear or piecewise continuous blurring function. The blurring function blurs a rectangular portion of an image so that the blurring can be embodied by vertical blurring followed by halls on pull blow. Blurring is done by getting on portion of the line of pixels, adding and dividing by the number of pixels. All the columns are blurred, followed by all of the rows being blurred. The columns and rows can be blurred at the same time to maximize the number of cache hits.

30 Claims, 3 Drawing Sheets

U.S. PATENT DOCUMENTS

| | | |
|---|---|---|
| 2004/0061926 A1 | 4/2004 | Hunt |
| 2004/0125602 A1 | 7/2004 | Hunt et al. |
| 2004/0141721 A1* | 7/2004 | Hatalsky ............... 386/52 |
| 2004/0160198 A1 | 8/2004 | Hewlett et al. |
| 2005/0041229 A1* | 2/2005 | Meisburger ............ 355/53 |
| 2005/0057543 A1 | 3/2005 | Hunt et al. |
| 2005/0083487 A1 | 4/2005 | Hunt et al. |
| 2005/0086589 A1 | 4/2005 | Hunt |
| 2005/0094635 A1 | 5/2005 | Hunt |
| 2005/0169514 A1* | 8/2005 | Prince ................. 382/150 |
| 2005/0190985 A1 | 9/2005 | Hunt |
| 2005/0200318 A1 | 9/2005 | Hunt et al. |
| 2005/0200625 A1 | 9/2005 | Hunt |
| 2005/0206328 A1 | 9/2005 | Hunt |
| 2005/0207163 A1 | 9/2005 | Hunt |
| 2005/0213335 A1 | 9/2005 | Hunt |
| 2006/0158461 A1 | 7/2006 | Reese et al. |
| 2006/0187532 A1 | 8/2006 | Hewlett et al. |
| 2006/0227297 A1 | 10/2006 | Hunt |
| 2007/0165905 A1 | 7/2007 | Hunt |
| 2007/0168851 A1 | 7/2007 | Hunt |
| 2007/0168862 A1 | 7/2007 | Hunt |
| 2007/0211171 A1 | 9/2007 | Hunt et al. |

* cited by examiner

REDUCED COMPLEXITY AND BLUR TECHNIQUE FOR AN ELECTRONIC LIGHTING SYSTEM

This application claims priority from Provisional application No. 60/534,607, filed Jan. 5, 2004.

BACKGROUND

Electronically controlled stage lights may use a computer to control the output of a digitally, pixel level controllable, lighting projector. For example, a processor may produce a digital output that controls a digital micromirror based processing device, such as a DLP projector.

An image is used as the control for the projector. Different lighting effects may be carried out on the image which is used to drive the projector to produce the lighting output. Many of the image operations which were previously carried out by physical components, such as lenses, cut gobos, and the like may be effected by a digital electronic technique which simulates the effect of those physical components. Other effects are described in U.S. Pat. Nos. 5,828,485; 6,057,958, and others, and may include image rotation, image movement, or other image manipulation operations.

One such effect is a blur effect which has been traditionally carried out by a Gaussian type lens which blurs the image. The traditional thinking is that a digital version of the Gaussian blur would involve taking the original image pixel by pixel, and calculating a blurred value for each pixel in the blurred image based on the values of the pixels that surround the equivalent pixel in the source image.

Conventional Gaussian blurring would take the area of a blur window used in a calculation specified as a circle containing the source pixel, centered on the destination pixel, as shown in FIG. 1. Each of the source pixels would then be weighted by a value related to the radial distance from the pixel to the center of the circle, according to a Gaussian weighting. Pixels closest to the circle's center will have a greater weighting than pixels nearest the edge. A conventional Gaussian weighting is shown in FIG. 2. The weighting of the Gaussian would therefore weigh various pixels by different amounts.

SUMMARY

The present inventor recognized that the calculation load for such a blur would be overwhelming. For example, for large degree of blur, one might desire a circle of 32 pixel radius. This would involve a sequence of 3216 loads, multiplies and additions to calculate the value of each single pixel. Therefore, for a 720×480 pixel video screen (the size of the conventional DLP unit), this would require over 1.1 billion operations just to blur a single frame. This would become even more aggravated in a color, RGB image, which would require each color component to be blurred individually, tripling the above value. This has led those of ordinary skill in the art to conclude that it was impossible to digitally blur such an image.

The present system teaches optimizations and simplifications which may be used to allow blurring the image in a way that avoids the enormous calculation load described above.

According to a first aspect, a rectangular blur window is used to simplify the operation of blurring into two orthogonal dimensions of blur.

Another aspect simplifies the Gaussian into either a simple single-weighted curve, or to a piecewise continuous curve which simplifies the calculations and enables certain ones of the calculations to be stored within accumulators so that only a few new values need to be calculated for each blur neighborhood.

BRIEF DESCRIPTION OF THE DRAWINGS

These and other aspects, will now be described in detail with reference to the accompanying drawings, wherein.

DETAILED DESCRIPTION

Figure 1:
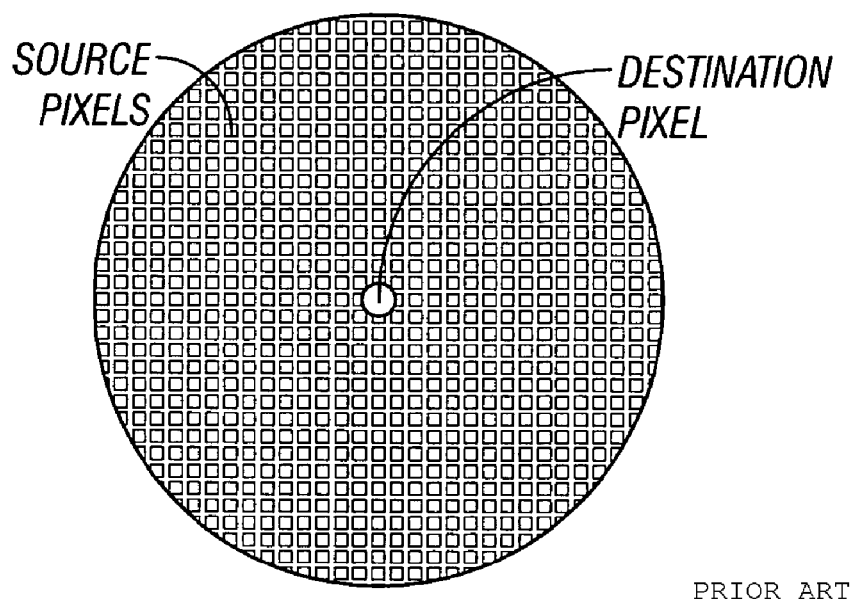
FIG. 1 shows a conventional blur window.
Figure 2:
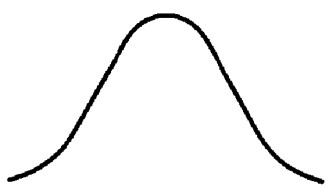
FIG. 2 shows a conventional weighting of a blur curve.
Figure 3:
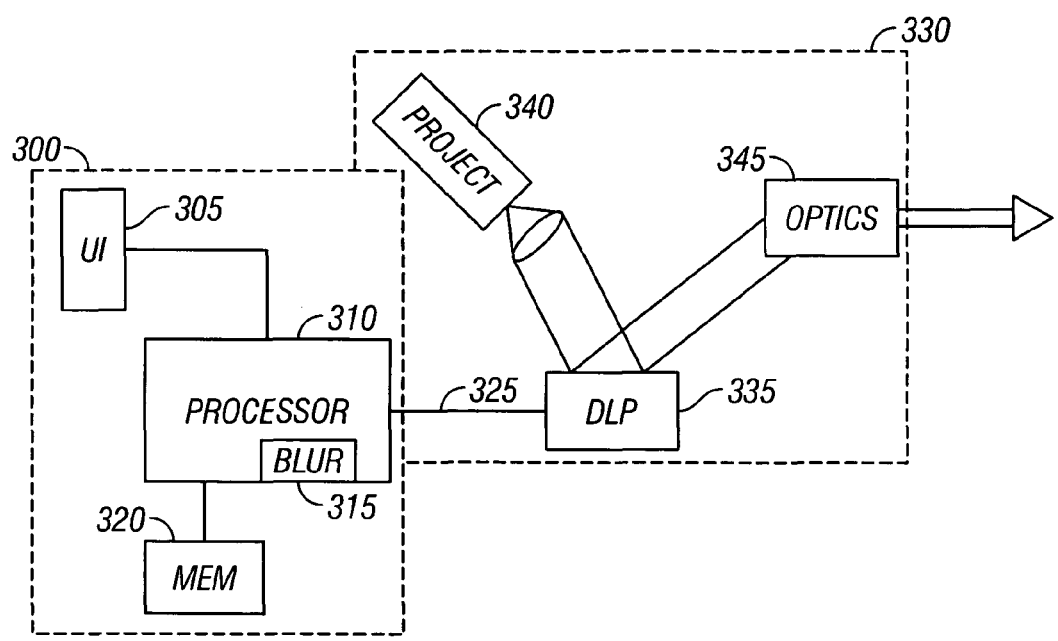
FIG. 3 shows an exemplary hardware layout of the present system.

An exemplary hardware layout embodying the present system is shown in FIG. 3. A control device 300 includes a user interface 305 which allows entry of commands to effect the output image signals, and image processor 310, responsive to the signals from the user interface 305, including a special blur module 315, and a memory 320 which stores prestored image features such as shapes and videos. The blur module 315 can include dedicated hardware to carry out the blur function described herein. Alternatively, the blur module 315 may include code that is written to execute on the processor device 310.

The control device 300 produces an output signal 325 which drives a DLP projector 330. The DLP projector 330 includes a DLP assembly 335 driven by a light source 340, and optics 345 which directs the light as shaped, processed and colored by the DLP. While the above shows the operation being carried out by a DLP, it should be understood that the operation can alternatively be carried out by any pixel level controllable light altering device. In addition, while FIG. 3 shows the controller 300 being physically separate from the projector 330, the controller 300 can be built into the projector 330, or parts of the controller 300 can be built into the projector 330.

Figure 4:
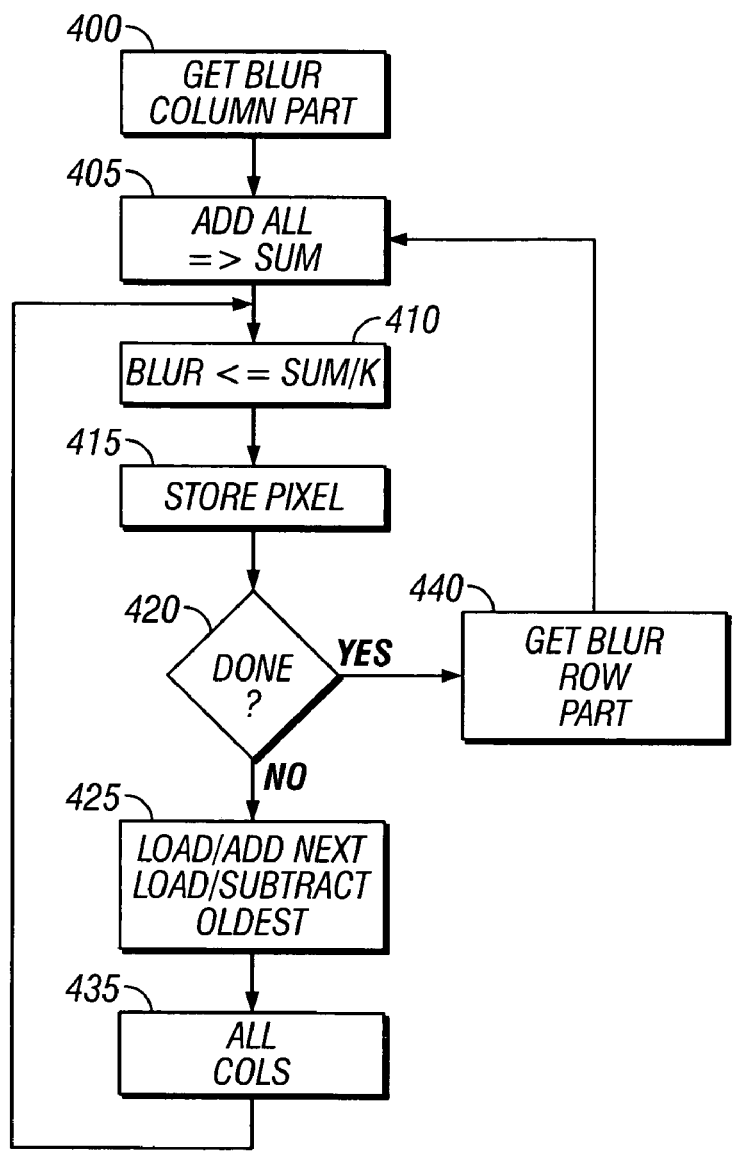
FIG. 4 shows a flowchart of operation of the hardware.

The processing follows the flow shown in FIG. 4. Effectively, this process blurs the information within the window by blurring the image twice: first in the horizontal direction and then in the vertical direction. Two passes are used. Either a single row or column of pixels is being processed during a pass.

Figure 5:
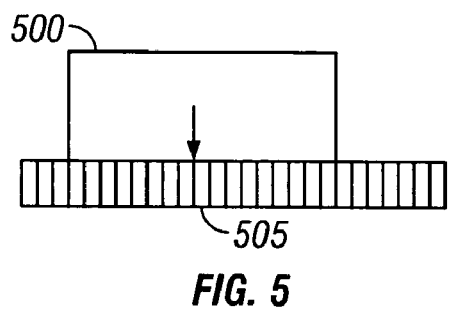
FIGS. 5 and 6 show an illustration of adding the different values while the window is moved.
Figure 6:
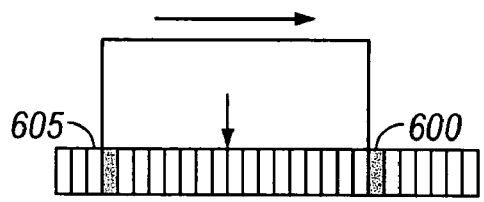

At any time during the process, FIG. 5 illustrates how the value of the destination or center pixels is represented by the sum of all pixels within the blur window, divided by a constant which is equal to the number of pixels in the blur window or width of the blur window. As the blur window steps across the image, the sum of all pixels inside the window changes. However, each single change only adds one single pixel and subtracts another single pixel. In FIG. 6, the pixel 600 is added, while the pixel 605 is subtracted.

The operation follows the flowchart shown in FIG. 4. At 400, the first blur column part, shown as 500 in FIG. 5, is obtained. The process may start at minus W pixels, where W is the width of the blur window, and end at N+W pixels, where N is the number of pixels in the row. This facilitates blurring edge pixels, using the outside (black) portions of the image for the blurring of the edges.

Each of the individual pixels within the area 505 is added to form the value SUM at 405. The center value, or the center pixel 505 is calculated as the value BLUR. BLUR is calculated as BLUR equals SUM/K at 410. The value of the pixel BLUR is stored as the new pixel value at 415.

At 420, this system tests to determine if the columns are completed. If not, then the next column part is obtained at 425. This includes loading and adding the next pixel, 600 in FIG. 6, and subtracting the oldest pixel, 605 in FIG. 6.

When all of the columns are done, shown as 420, then the next blur row part is obtained at 440, and the process continues to add the once-blurred values for each vertical part and divided by the value K. Again, the mathematics which is used is relatively simple, so the execution can be carried out extremely quickly.

Certain processors have difficulty in executing division, and in those processors, simplifications such as multiply and right shift can be used instead of division.

The above has described the blur window processing the entire image. Alternatively, simple extensions of the basic process can be carried out where the blur process operates only over portions of the image defined by preamble and post-amble code sections.

The process disclosed in FIG. 4 simplifies and allows the process of blurring to occur much more rapidly. According to another aspect, vertical and horizontal blurring may be carried out simultaneously using separate processing threads.

Even more rapid results may be obtained when reading and writing are carried out to cache lines within memory. During the horizontal portion of the operation, it is likely that each new pixel will be in the same cache line of memory, since the image scan lines tend to place horizontally adjacent pixels sequentially in memory. During the vertical or row processing portion, however, each new pixels will likely not be within the cache. This may reduce the performance of the blurring in the vertical direction.

According to another aspect of this system, a divided sum is stored for each whole or part column as a local copy. The blurred and divided sum is then used in place of each individual pixel within that column. This sum accumulates the values for the entire column. Since these sums are read and written many times during the blur process, but are not always in the same place, it becomes much more likely that cache hits will be obtained from these sums.

By improving the cache hits in this way, the technique may be limited by memory bandwidth instead of processing speed.

This system also requires that the sum register hold many pixel values with overflow and therefore requires that the sum register have more significant bits than the pixel itself. Assuming a pixel data and eight bits, a 16-bit sum register will hold 256 values without overflow. When blurring in a single pass, it may be necessary to use 32-bit sum registers.

Although only a few embodiments have been disclosed in detail above, other modifications are possible, and this disclosure is intended to cover all such modifications, and most particularly, any modification which might be predictable to a person having ordinary skill in the art. For example, while the above has described operating on a programmed processor, it is envisioned that this be done on a dedicated hardware card with registers and accumulators carrying out the blur much more quickly than is possible using a processor.

The above has described the noncontinuous blurring kernel as being simply a square function, with all values in the kernel of the blur receiving the same weight (here one). However, it may be possible to approximate the Gaussian curve using a piecewise continuous curve, in which the values towards the edge are weighted by a smaller value, e.g. one half, and values in the center are weighted by a higher value e.g. one. Similar simplifications to those given above are possible. If that piecewise continuous curve has two different weighting functions, then four pixels need to be processed each time the accumulators shift instead of two pixels being processed as in the first embodiment. Any non-continuous curve of this type can be used. Preferably, fewer than 20% of the values within the window are processed during each window shift.

All such modifications are intended to be encompassed within the following claims.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
using a processor that is programmed for carrying out a blur on an image using a blurring kernel, where said processor is programmed for using said blurring kernel at different areas across an image from one edge to another edge; and
using values to blur edge pixels of the image based on areas that are not part of the image.

2. A method as in claim 1, wherein said blurring kernel has a single weighting value for all values within the kernel.

3. A method as in claim 1, wherein said blurring kernel has first and second weighting values for all values in the kernel.

4. A method as in claim 1, wherein said blur is carried out on a rectangular portion of the image.

5. A method as in claim 4, wherein said rectangular portion is a square portion.

6. A method as in claim 4, wherein said carrying out a blur comprises first blurring in a first direction, and second blurring in a second orthogonal direction.

7. A method as, in claim 6, wherein said first blurring and said second blurring are carried out serially, with said first blurring being carried out and then said second blurring being carried out.

8. A method as in claim 6, wherein said first blurring and said second blurring are carried out substantially simultaneously.

9. A method as in claim 7, wherein said first blurring, which is carried out first, is carried out in a vertical direction.

10. A method, comprising:
obtaining an image;
using a processor that is programmed for digitally blurring the image using a rectangular blurring area to blur the image by using the program in the processor for moving a blurring kernel across the image where said blurring kernel blurs different areas of the image at different times by summing the image within the kernel at said different areas; and
said processor-programmed for using a value other than from the image to blur edge areas of the image.

11. A method as in claim 10, wherein said rectangular blurring area is carried out in two separate passes.

12. A method as in claim 10, wherein said rectangular blurring area is blurred by using a vertical pass for vertical blurring and a horizontal pass for horizontal blurring.

13. A method as in claim 10, wherein said digitally blurring comprises using a noncontinuous blurring kernel to blur pixels of the image.

14. A method as in claim 13, wherein said noncontinuous blurring kernel is a blurring kernel which has a single weighting value for each value within the kernel.

15. A method as in claim 13, wherein said noncontinuous blurring kernel is a blurring kernel which has two separate weighting values for different values within the kernel.

16. A method as in claim 10, wherein said rectangular blurring area is blurred in two orthogonal directions which are calculated substantially simultaneously.

17. A method as in claim 13 further comprising taking steps which improve a number of cache hits during said blurring.

18. A method, comprising:
obtaining an image; and using a processor which is programmed for digitally blurring the image using a rectangular blurring area to blur the image, said processor programmed for taking steps which improve a number of cache hits during said blurring, and wherein said taking steps comprises adjusting an order of pixel processing to improve a number of cache hits.

19. A method, comprising:
obtaining an image; and using a processor which is programmed for blurring the image by shifting a blurring window across the image, where said blurring window is programmed to change values of some, but not all, pixels within the window during each said shifting, said processor programmed for maintaining a sum of pixels in a cache memory, and using said sum for a subsequent shifting.

20. A method as in claim 19, wherein said blurring comprises changing the values of only two pixels during each said shifting.

21. A method as in claim 20, wherein said two pixels comprise edge pixels on both sides of the window.

22. A method as in claim 19, wherein said blurring comprises changing the values of only four pixels during each shifting.

23. A method as in claim 19, wherein said shifting comprises first shifting across the image in a first direction, and second shifting across the image in a second direction, substantially orthogonal to said first direction.

24. A method as in claim 19, wherein said blurring comprises blurring a substantially rectangular area.

25. A method as in claim 1, wherein said area that is not part of the image is a value indicative of black.

26. A method as in claim 1, further comprising arranging pixels in cache memory in a way that improves a number of cache hits during said blur.

27. A method as in claim 10, wherein said value other than from the image is a value indicative of black.

28. A method as in claim 18, wherein said digitally blurring comprises moving a kernel across the image where said blurring kernel blurs different areas of the image at different times by summing the part of the image which in the kernel at said different areas.

29. A method as in claim 18, wherein said blurring comprises using a value other than within the image at to blur edges of the image.

30. A method as in claim 29, wherein said value is a value indicative of black.

* * * * *